(12) United States Patent
Palmer et al.

(10) Patent No.: US 11,596,913 B2
(45) Date of Patent: Mar. 7, 2023

(54) METHODS OF HIGH THROUGHPUT HYDROCOLLOID BEAD PRODUCTION AND APPARATUSES THEREOF

(71) Applicant: ClearH2O, Inc., Westbrook, ME (US)

(72) Inventors: Jay Palmer, Brunswick, ME (US); Paul Dioli, Yarmouth, ME (US)

(73) Assignee: ClearH2O, Inc., Westbrook, ME (US)

( * ) Notice: Subject to any disclaimer, the term of this patent is extended or adjusted under 35 U.S.C. 154(b) by 0 days.

(21) Appl. No.: 17/377,876

(22) Filed: Jul. 16, 2021

(65) Prior Publication Data
US 2023/0018393 A1 Jan. 19, 2023

(51) Int. Cl.
| | |
|---|---|
| *B01J 2/06* | (2006.01) |
| *B01J 13/00* | (2006.01) |
| *C08L 5/04* | (2006.01) |
| *B01J 2/08* | (2006.01) |
| *B01J 19/00* | (2006.01) |
| *B01J 19/28* | (2006.01) |

(52) U.S. Cl.
CPC . *B01J 2/06* (2013.01); *B01J 2/08* (2013.01); *B01J 13/0069* (2013.01); *B01J 19/0053* (2013.01); *B01J 19/285* (2013.01); *C08L 5/04* (2013.01)

(58) Field of Classification Search
CPC .. B01J 2/08; B01J 2/06; B01J 13/0052–0069; C08L 5/04; A61D 7/00; A23K 50/75; A23K 20/163; A23K 20/195
See application file for complete search history.

(56) References Cited

U.S. PATENT DOCUMENTS

| | | | | |
|---|---|---|---|---|
| 3,272,893 | A * | 9/1966 | Mogensen | B01J 2/06 425/8 |
| 5,211,980 | A * | 5/1993 | Cox | A23K 20/158 426/515 |
| 5,766,907 | A * | 6/1998 | Chang | C12P 19/14 435/395 |
| 6,238,690 | B1 * | 5/2001 | Kiefer | B01J 13/04 424/463 |
| 2005/0238746 | A1 * | 10/2005 | Crather | B29C 48/0022 425/313 |
| 2007/0082045 | A1 * | 4/2007 | Yamanaka | A61J 3/07 264/4.1 |
| 2010/0209525 | A1 * | 8/2010 | Bohmer | A61K 9/1647 424/501 |

(Continued)

OTHER PUBLICATIONS

Leong et al., "Advances in fabricating spherical alginate hydrogels with controlled particle designs by ionotropic gelation as encapsulation systems", Elsevier, Particuology, ScienceDirect, 2016, vol. 24, pp. 44-60, 17 pages.

*Primary Examiner* — Mary Lynn F Theisen
(74) *Attorney, Agent, or Firm* — Hayes Soloway P.C.

(57) ABSTRACT

Methods of high throughput hydrocolloid bead production and related apparatuses are described herein. In the disclosed methods, drops of a hydrocolloid gel suspension are dropped into a reactant bath. The drops of hydrocolloid gel are exposed to the reactant bath for a predetermined period of time, during which the drops form firm or semi-firm beads. The beads are then removed from the reactant bath. The resulting hydrocolloid beads are advantageously resistant to syneresis and can provide high nutritional and water content.

18 Claims, 10 Drawing Sheets

(56) References Cited

U.S. PATENT DOCUMENTS

| | | | |
|---|---|---|---|
| 2014/0017304 A1* | 1/2014 | Bosmans | A61K 35/407 264/4.1 |
| 2017/0209250 A1* | 7/2017 | Palmer | A61M 11/02 |
| 2019/0284349 A1* | 9/2019 | Bassett | A61P 39/04 |
| 2021/0138106 A1* | 5/2021 | Hutchins | A61L 26/0066 |

* cited by examiner

Method 200

```
Dispensing drops of a hydrocolloid gel suspension into a
reactant bath
202
          │
          ▼
Exposing the drops to the reactant bath for a
predetermined period of time, wherein the drops form
firm or semi-firm beads as they remain in the reactant
bath
204
          │
          ▼
Removing the beads from the reactant bath
206
          │
          ▼
Optionally reintroducing deionized reactant back into
the reactant bath
208
```

FIG. 10

METHODS OF HIGH THROUGHPUT HYDROCOLLOID BEAD PRODUCTION AND APPARATUSES THEREOF

FIELD OF THE DISCLOSURE

The disclosure relates to methods for creating hydrocolloid beads, particularly at a high rate of production, and apparatuses for performing such methods.

BACKGROUND

Hydrocolloids are a heterogeneous group of long chain polymers that are known to form viscous dispersions and/or gels when dispersed in water. They contain a large number of hydroxyl (—OH) groups, which increases their ability to bind with water molecules, thus rendering them hydrophilic compounds. Additionally, they produce a dispersion that exhibits the properties of a colloid.

SUMMARY

Hydrocolloids are commonly used in food products due to their viscosity and texture, i.e., they are good thickening and/or gelling agents that are beneficial to a wide range of food products from soups to ice creams. Hydrocolloids that are known to be good gelling agents include: modified starch, k-carrageenan and i-carrageenan, pectin, gellan gum, alginate and cellulose.

In some instances, various combinations of hydrocolloids and reactant solutions are known to form hydrogel beads. For example, alginate hydrogel beads have been explored as a texture additive and as a delivery vehicle. However, creating a hydrogel bead that maintains its form has proven difficult. For example, previous types of hydrogel beads experience syneresis, which is the undesirable expulsion of water from the bead. Additionally, producing useful beads in mass quantities is also a challenge. What is needed, therefore, is a method of efficiently creating firm and stable hydrocolloid beads in large quantities.

Previously known hydrogel beads contain mostly water, along with some corn syrup, sodium alginate, and preservative. However, these conventional hydrogel beads lack robust nutritional content. Also, conventional hydrogels that contain more nutrients tended to be irregularly-shaped and difficult to dispense to animals or produce using efficient manufacturing processes. Extruded high moisture diets and nutrition supplements can sometimes contain more nutrients but can't accommodate sufficient water to provide ideal hydration to the animal. In contrast with previously known techniques, the presently disclosed devices and methods are capable of producing nutrient-rich beads that are also high in water content to provide sufficient hydration to animals. For example, in some embodiments, the presently disclosed beads can contain approximately 5% protein, along with fiber, carbohydrates, and water, while also having a substantially uniform size and shape.

High throughput processes of hydrocolloid bead production that are able to generate millions of hydrocolloid beads per minute are disclosed herein. The hydrocolloid beads may then be used for a variety of purposes, such as a top dressing for poultry, starter supplemental hydration for poultry, vaccinations, and/or probiotic or nutrient delivery systems for poultry. The beads may also be used in the creation of human food products, such as flavor inclusion beads for ice cream toppings, imitation caviar and specialty food flavor beads for jams and jellies. Additionally, the beads may be used to supply hydration and nutrients to other animals, such as rodents, swine, cattle and horses as, for example, hydration and/or nutritive support, or as a flavor attractant, in some embodiments.

The disclosed processes take a hydrocolloid gel suspension, typically comprising water and up to 10% hydrocolloid and introduce the gel suspension into a reactant bath to create soft to firm beads. The resulting beads typically measure between 1 millimeter ("mm") and 5 mm in size. The centipoise of the gel suspension can range from 0-5,000 centipoise. This process may be performed with either a cold or hot gel suspension, and the reactant bath may be comprised of only distilled water or a combination of water with various ions present, such as potassium ions (K+), calcium ions (Ca2+) and/or magnesium ions (Mg2+). The bath may also contain a preservative, such as potassium sorbate.

The disclosed processes can accomplish several goals simultaneously. For example, in addition to catalyzing the crosslinking process involved in forming the beads, the process can also, in some embodiments, pasteurize the beads. In some such embodiments, a heated reactant bath may be used. For example, in select embodiments, the reactant bath may be heated to 250° F. or higher to catalyze the crosslinking process for bead formulation. In these and other embodiments, the beads may be pasteurized at a temperature of 250° F. or higher after exiting the reactant bath. Numerous configurations and variations of the bead formation process and either concurrent or subsequent pasteurization are possible and contemplated herein.

An apparatus is provided to pump the gel solution through a plurality of manifolds that dispense the gel through a plurality of nozzles and into the reactant bath. The gel drops begin to form firm or semi-firm beads when they enter the bath and harden over time while exposed to the bath. The bath may be provided in an inclined tray or conveyor type of system such that the beads run downstream in the bath, exiting the bath after a pre-determined amount of time that is calculated to create the desired level of bead firmness. The time may range from a few seconds to a few minutes, depending on how firm the beads should be. As the beads exit the bath they fall onto or into a machine that shakes the excess reactant off the beads, after which the beads are rinsed with water or with a water salt solution (optionally containing preservative) and packaged for storage and/or delivery. If desired, the excess reactant can be recycled back through the apparatus to help form new beads. In some situations, the beads may also be dried such that their moisture content is between 0% and 95%. The resulting dried beads may have a diameter of 0.100 mm to 5 mm, depending on moisture content. Additionally, the resulting beads may advantageously be resistant to or free from syneresis.

BRIEF DESCRIPTION OF THE DRAWINGS

The present disclosure makes reference to the accompanying drawings. In the drawings, like reference numbers indicate identical or functionally similar elements. The drawings are not necessarily drawn to scale.

FIG. 10 is an exemplary high-throughput method of producing hydrocolloidal beads, in accordance with some embodiments of the subject disclosure.

DETAILED DESCRIPTION

Figure 1:
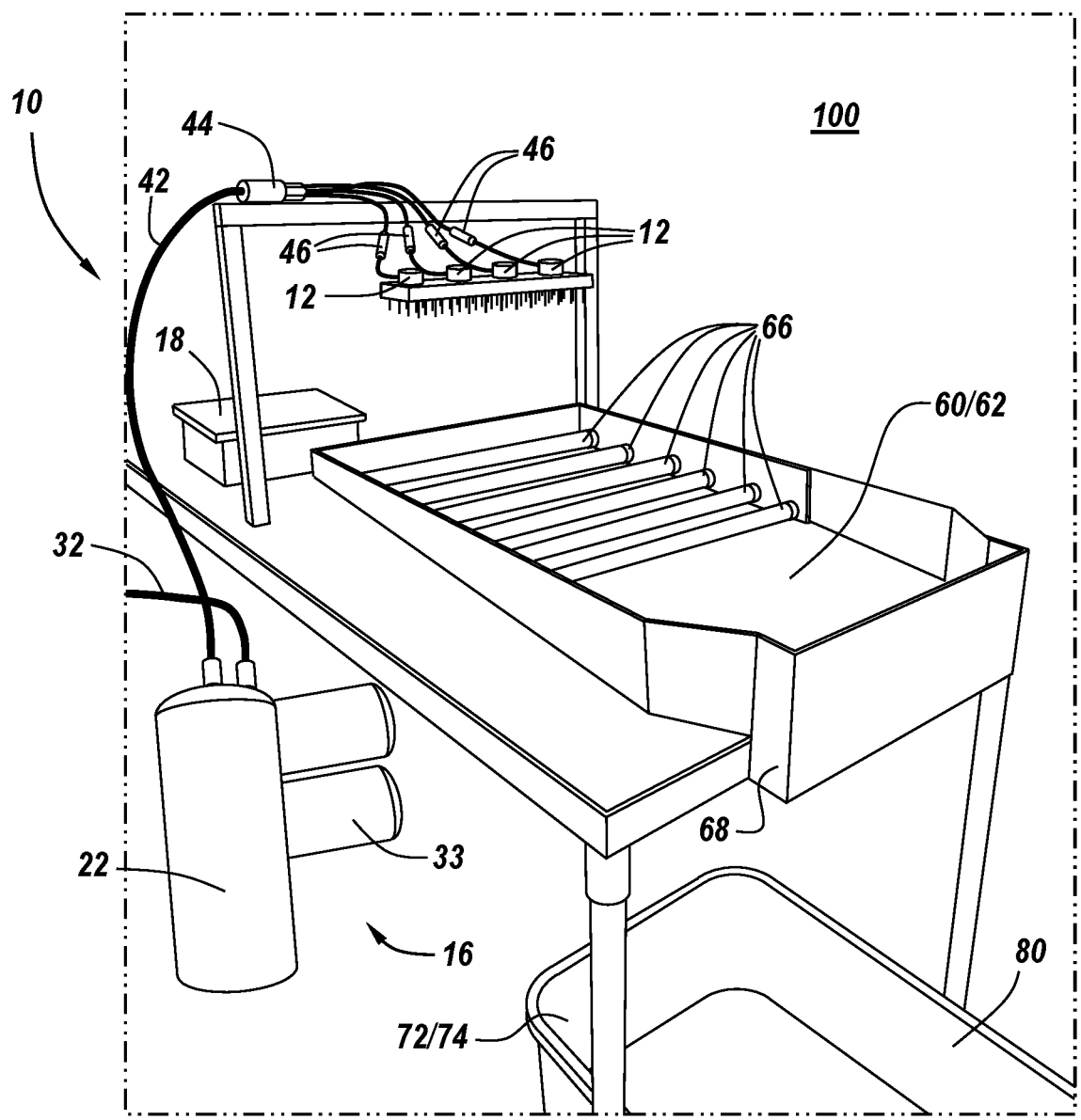
FIG. 1 is a front and side perspective view of an exemplary apparatus according to some embodiments of the present disclosure.

The presently disclosed devices and methods will now be described more fully in detail with reference to the accompanying drawings, in which some embodiments of the present disclosure are shown. This disclosure should not, however, be construed as limited to the embodiments set forth herein; rather, they are provided so that this disclosure will be complete and will fully convey the scope of the inventive subject matter to those skilled in the art.

High-throughput methods of creating hydrocolloid beads and devices for practicing the disclosed method will now be described. In use, the methods are capable of generating millions of firm or semi-firm hydrocolloid beads per minute. In some embodiments, the presently disclosed methods are capable of producing at least forty (40) pounds of beads every two (2) minutes.

In some embodiments, the presently disclosed methods use a dispensing apparatus to dispense drops of a hydrocolloid gel suspension into a reactant bath. In some embodiments, the hydrocolloid gel suspension is forced through a plurality of nozzles using a pressured line. As the gel suspension exits the nozzles, it forms drops by natural force (e.g., gravity) and/or mechanical force (e.g., shearing the gel suspension via nozzle vibration, a spinning disk, or a spinning wire). The drops them enter the reactant bath. Once the drops are in the bath, they are guided down an inclined tray, chute, or conveyor in the reactant bath for a predetermined amount of time, during which the drops of gel form into firm or semi-firm beads. The time the gel droplets are left in the bath may vary from a little as a few seconds to as long as five minutes, with the beads continuing to harden over as they dwell in the bath. When the beads reach the end of the conveyor they exit the bath and enter a drainage basin. Once the beads have exited the bath they are rinsed at least one time with water or with a water salt solution (optionally containing one or more preservatives) and then packed for storage and/or transportation. In some instances, depending on the intended use of the end user, the beads are then dried.

The hydrocolloid gel suspension may have a viscosity that ranges from 0-5,000 centipoise, in some embodiments. The hydrocolloid gel suspension may be heated or, alternatively, may be used as a cold gel suspension. The gel suspension may include a single hydrocolloid or a combination of hydrocolloids, such as sodium alginate, pectin, gellan gum, k-carrageenan, xanthan gum, and/or locus bean gum.

In embodiments in which a heated reactant bath is used to form the hydrocolloid beads and/or the hydrocolloid gel suspension is heated, the heating process may, in some cases, partially or fully pasteurize the resulting hydrocolloid beads. Without wishing to be bound by theory, heating the hydrocolloid material(s) to at least 250° F. may result in at least partial pasteurization. Thus, embodiments in which the hydrocolloid beads are formed at temperatures of or exceeding 250° F. may serve to also pasteurize the resulting hydrocolloid beads. In these and other embodiments, the hydrocolloid beads may optionally be pasteurized after formation, if desired. Numerous configurations and variations of hydrocolloid bead formation and either concurrent or subsequent pasteurization are possible and contemplated herein.

The composition of the hydrocolloid gel suspension may vary based on the intended use of the end user. In some embodiments, the hydrocolloid gel suspension may be a relatively simple solution containing at least 90% by volume of water and up to 10% by volume hydrocolloid. In these and other embodiments, the gel suspension may also contain a humectant such as sorbitol, corn syrup, erythritol, glycerin, and/or other humectants. If present, humectants may occupy up to 30% of the total volume of the suspension. In certain situations, the gel suspension may contain up to 20% carbohydrates and/or 50% protein. In select embodiments, the gel suspension may include some combination of water, protein and carbohydrates in a ratio of, for example, 70%/20%/10% by volume, respectively. If present, the carbohydrates may be derived from corn syrup, sugar, high fructose corn syrup, sorbitol, erythritol, honey, molasses, and/or another carbohydrate source that is soluble in water. The protein source may be individual amino acids or complete protein sources such as fish protein, or other soluble proteins such as pea, soy, wheat, casein, and/or whey.

The reactant bath may consist of distilled water in some embodiments. However, in other embodiments, the reactant bath may include ions, such as K+, Ca2+, and/or Mg2+. In select embodiments, the reactant bath uses calcium chloride or calcium acetate as an ion source. The reactant bath may also contain a preservative, such as potassium sorbate, in some embodiments.

After the beads exit the bath, any remaining reactant may be removed from the beads by either shaking the beads and/or rinsing the beads. After reactant removal, the beads may be sprayed or otherwise exposed to a solution that may contain lecithin, preservatives, salts, and/or oils to coat the beads. The coated beads may be dried, in some embodiments, to achieve a desire moisture content ranging from 0% to 95%. There are a number of suitable methods for drying the coated beads, such as, for example, using a conventional conveyor dryer having a length of 5 feet to 20 feet. Conventional dryers have known ways to modify the extent of the drying to reach a desired moisture content.

The fully formed and ready to use beads can be between 0.100 mm and 5 mm in size and may contain up to 98% water. In some embodiments, the beads may have a moisture content of 70-95%. As noted, the beads may also contain up to 20% carbohydrates and 50% protein or some combination of water, protein and carbohydrates. In select embodiments, the beads contain 70% water, 20% protein, and 10% carbohydrates by volume.

FIGS. 1-9 illustrate an embodiment of a device 100 that can be used to practice the disclosed methods. The device 100 includes a delivery system 10, a reactant bath platform 60, and a rinse platform 80. The delivery system 10 dispenses gel drops into the bath platform 60, which is filled with a reactant solution, after which the gel drops form firm or semi-firm beads as they pass through the bath platform 60 and into the rinse platform 80.

The delivery system 10, shown in FIGS. 1-4 and 9, includes a plurality of spray manifolds 12, each manifold 12 having a number of dispensing ports 14, a pumping system 16, and a control unit 18.

Figure 9:
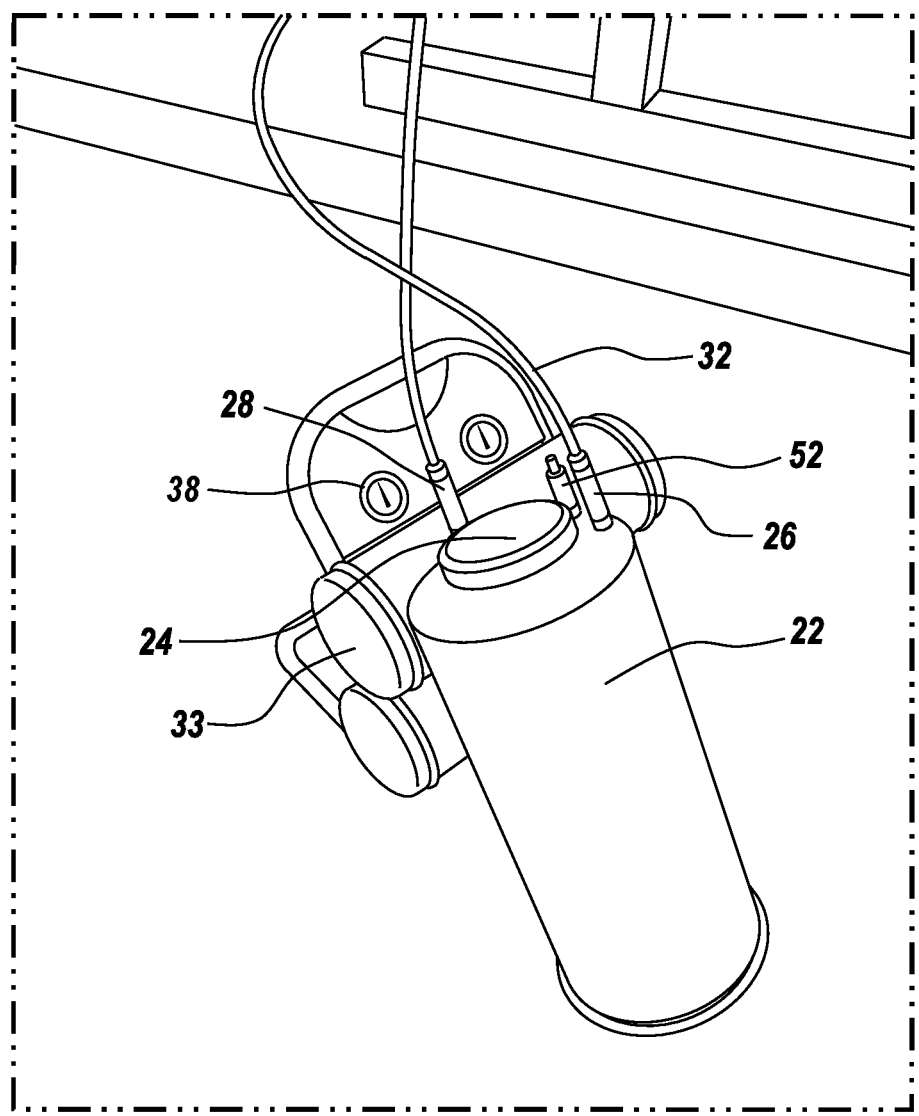
FIG. 9 is a side view of a portion of an exemplary gel delivery system.

The pumping system 16, shown in FIGS. 1 and 9, includes a conventional pump, which may be any suitable pump such as a peristaltic pump, positive displacement pump, or a pressurized pumping system. The embodiment shown includes a pressurized system, including at least one pressurized tank 22, each tank having a lid 24, at least one air intake port 26 and at least one solution exit port 28. An air hose 32 that connects on one end to an external compressed air source 33 and connects on the other end to an on/off valve 34, which in turn connects to an air filter 36 that connects to a pressure regulator 38. The pressure regulator 38 is connected the controller 18 and to the pressure tank 22 and serves to control the flow of air into the tank 22.

As air is pumped into the pressurized tank 22, the deliverable solution is forced out of the tank 22 through a first delivery tube 42 to one or more valves 44. The valves 44 may be any suitable valve, for example, a solenoid valve. One or more secondary delivery tubes 46 connects the valve 44 to the manifolds 12. The tank 22 may also include a safety pressure release valve 48 that releases pressure from the tank 32 in the event the pressure exceeds a preset level. A manual pressure release valve 52 may also be provided for additional user control.

Figure 2:
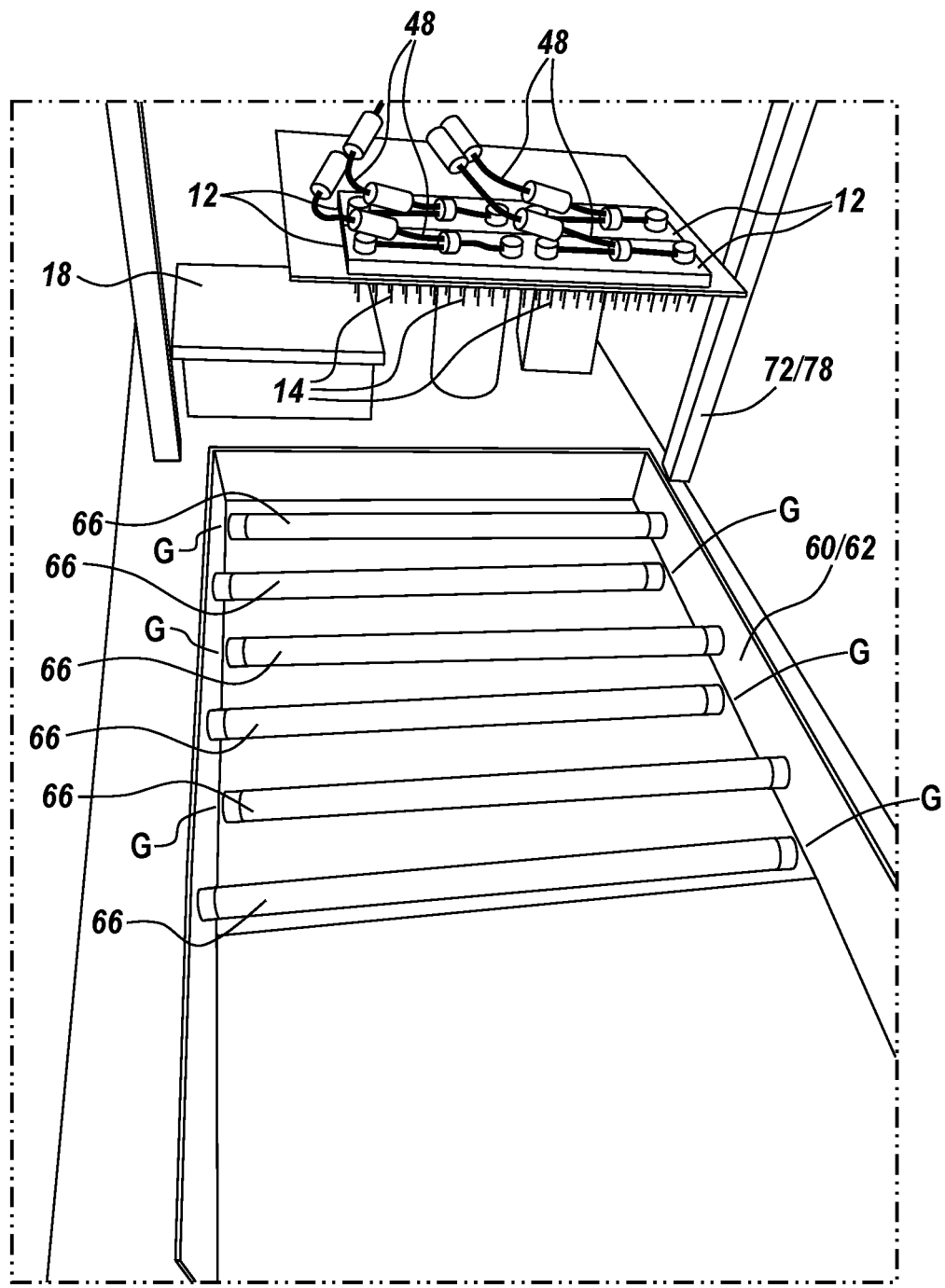
FIG. 2 is a front and top perspective view of the apparatus shown in FIG. 1.
Figure 3:
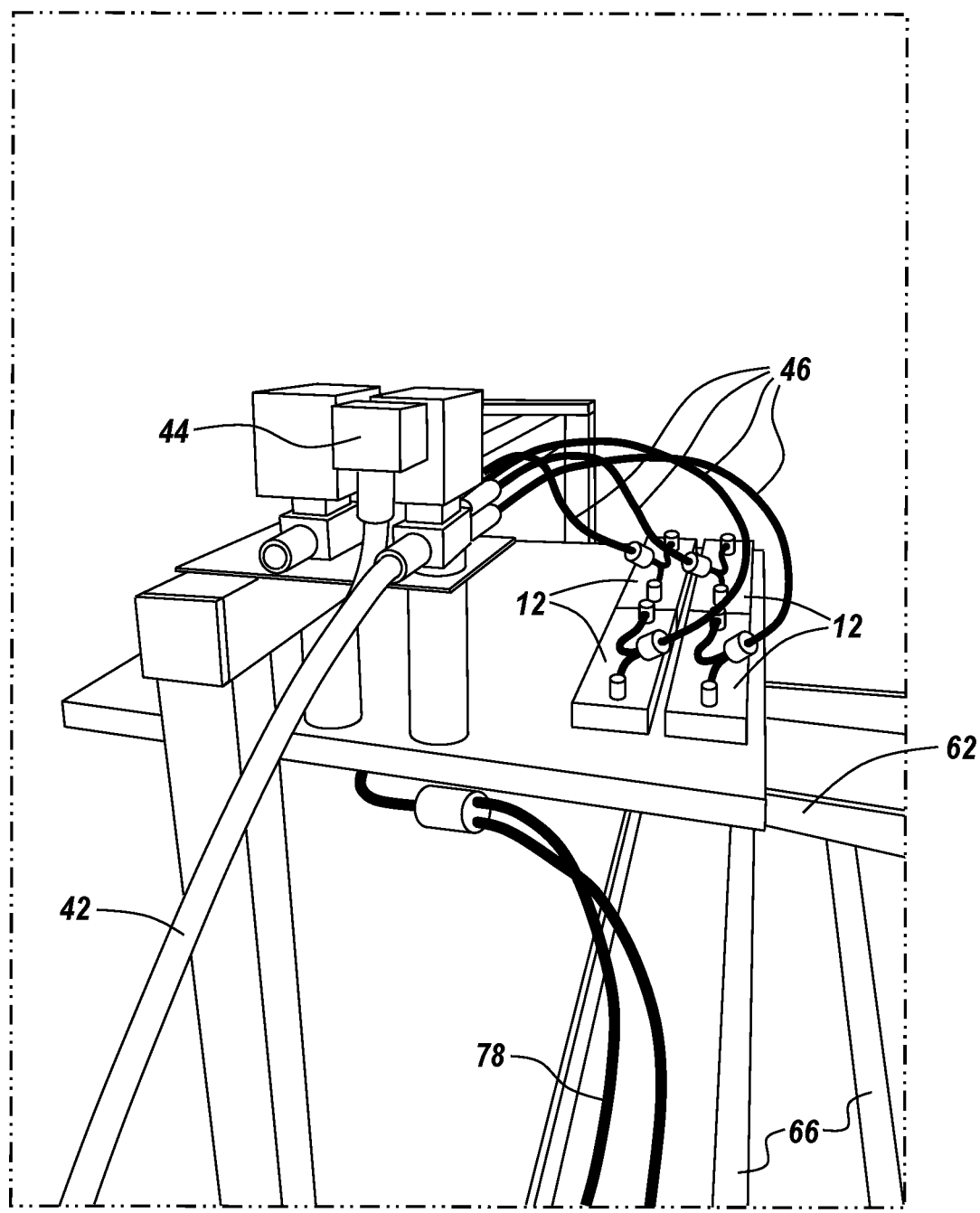
FIG. 3 is a side and top view showing the manifolds of the apparatus of FIG. 1.
Figure 4:
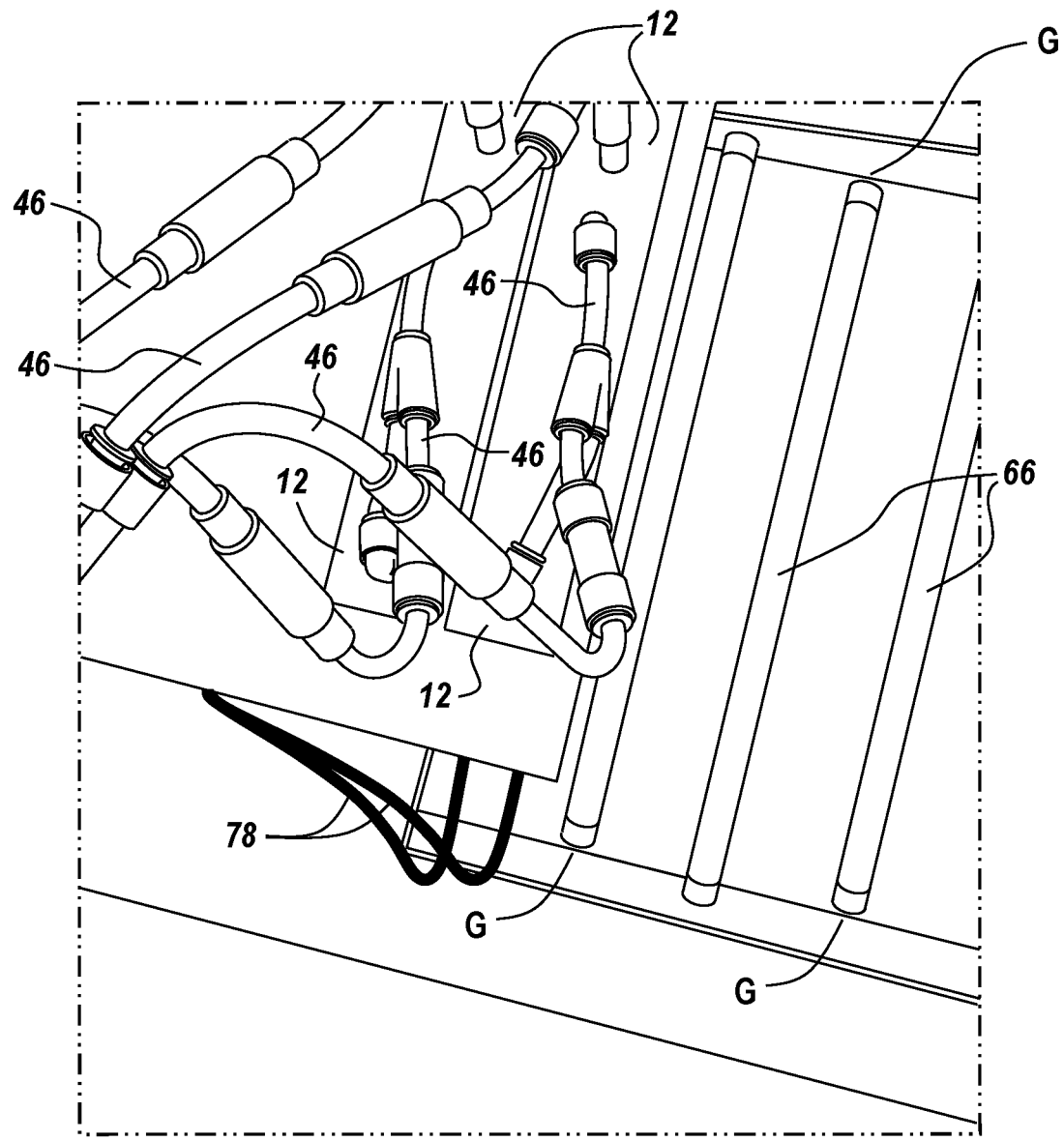
FIG. 4 is a top view of the manifolds shown in FIG. 3.

The control unit 18, shown in FIGS. 1 and 2, is a programmable device, such as a programmable logic controller (PLC), that is pre-programmed using conventional means to receive input from a user and perform certain actions based on that input, such as opening and closing valves to release the gel suspension from the tank 22 and through the manifolds' 12 dispensing ports 14.

Figure 5:
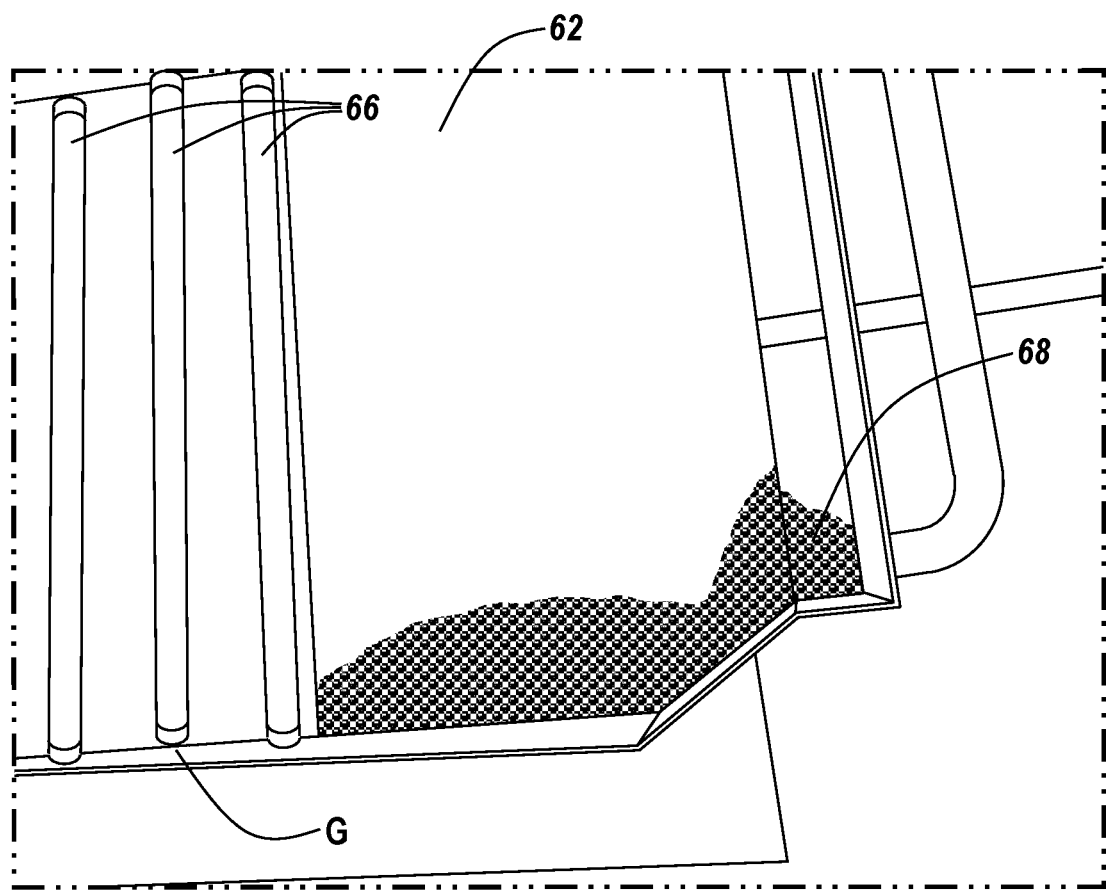
FIG. 5 is a top view of a portion of an exemplary reactant bath platform and an exemplary rinse platform, according to some embodiments of the present disclosure.
Figure 6:
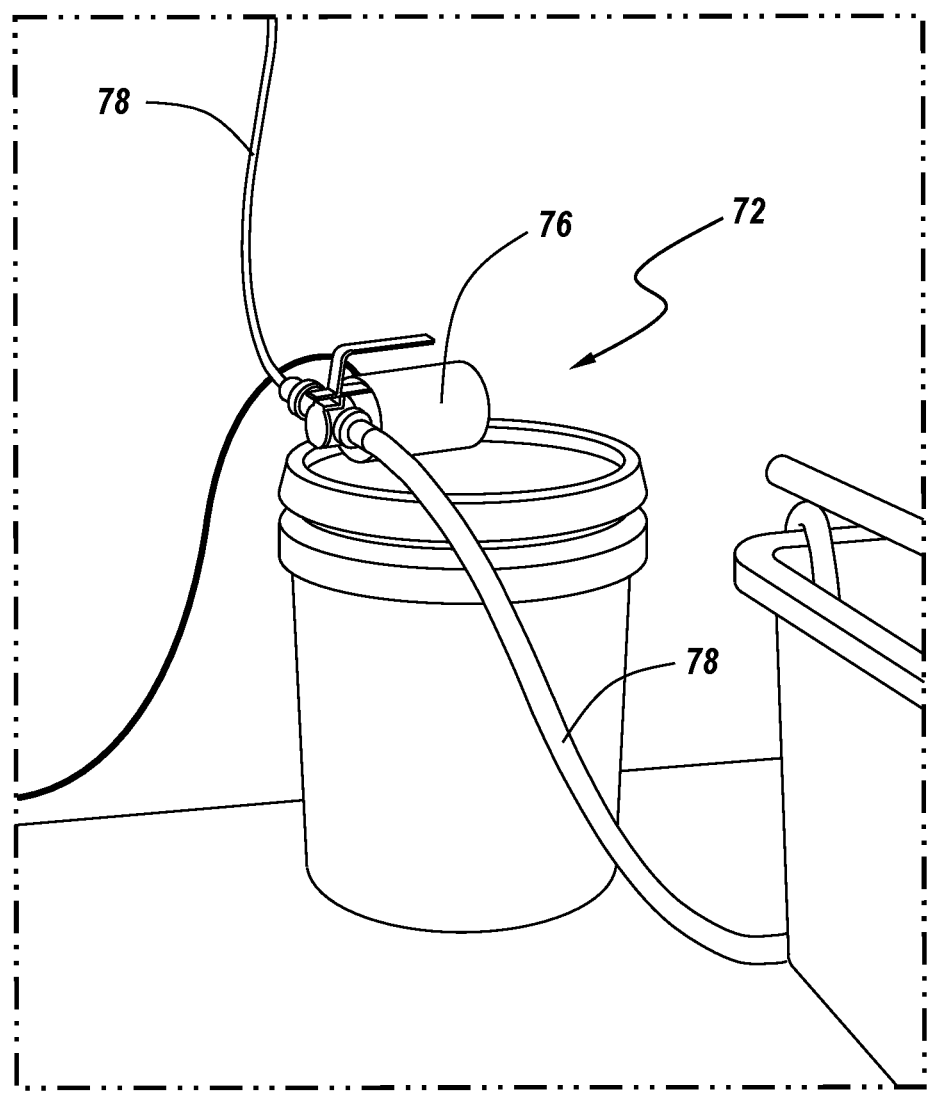
FIG. 6 is a partial view of an exemplary recirculation system.
Figure 7:
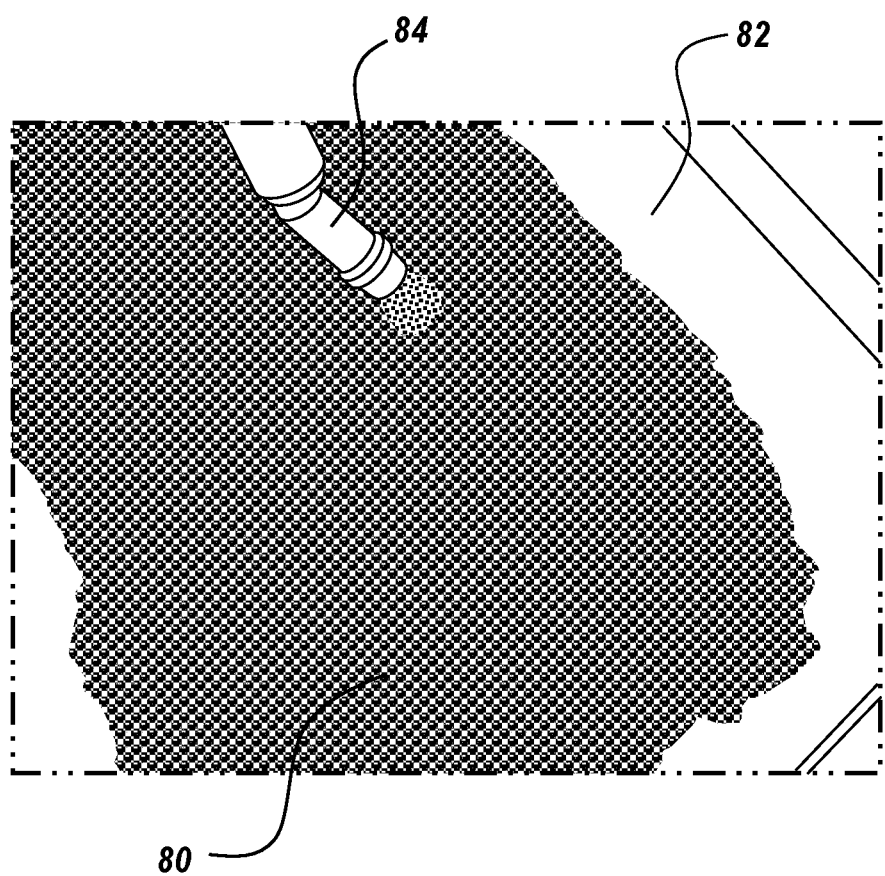
FIG. 7 is a top view of an exemplary rinse platform showing a large number of beads being rinsed.
Figure 8:
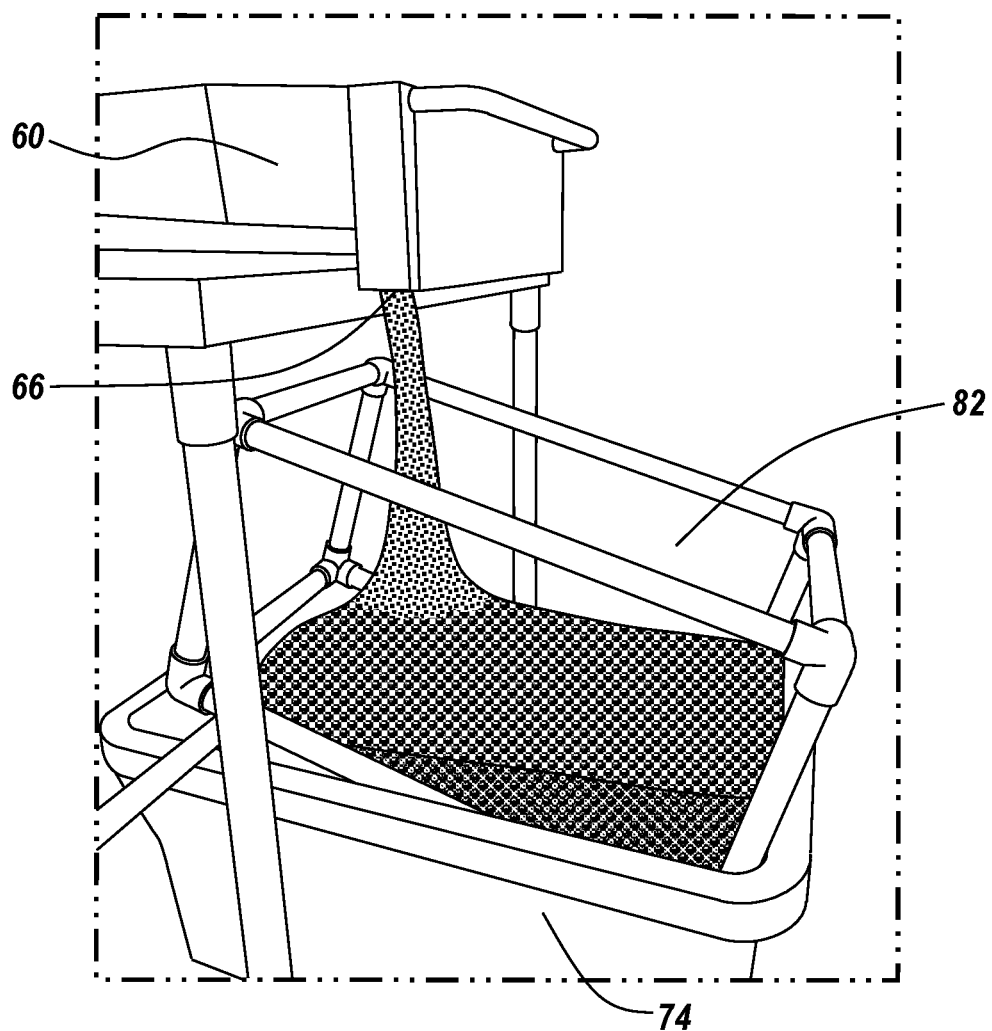
FIG. 8 is a side view of the exemplary rise platform shown in FIG. 7 illustrating beads exiting the bath platform and being drained in the rinse platform.

The bath platform 60, best shown in FIGS. 1, 2 and 5, includes an inclined tray 62, a step or ladder system that includes a number of gates or barriers 66 to the control the flow, and thereby the time of exposure, of the beads in the bath as they descend the inclined tray, an exit port 68 and a reactant solution recirculation system 72. The manifolds 12 are positioned above an upper end of the inclined tray 62, such that the gel solution is dispensed into the bath at the upper end of the tray 62. As the gel drops enter the solution they immediately take the shape of a bead, however, upon entering the bath they are still quite soft and not suitable for the end use. In this particular example, the tray is approximately four feet long and two feet wide having six barriers, which leads to a dwell time of the beads in the solution of roughly 3-4 seconds.

Following entry into the bath platform the soft beads begin to flow down the tray at a rate dictated by the incline of the tray and the flow of the reactant solution. The gates 66 form a barrier across a majority of the width of the tray, with a slight separation or gap G from a sidewall on one end of the tray. The side of the opening alternates from one gate 66 to the next such that the beads traverse back and forth across the width of the tray as they descend. After passing the final gate 66 the reactant solution and the beads fall through the exit port where the beads are captured in a drainage and rinse basin 80 and the reactant solution falls into the recirculation system 72. In another embodiment, the gates may be removed and the length of the tray extended to as to extend the amount of time it takes for the beads to reach the end of the tray.

The recirculation system includes a container 74 that captures the solution, a pump 76 to pull the solution out of the container and a piping or tubing 78 that directs the solution from the container 74 to the upper end of the inclined tray 62. As gel drops enter the reactant bath and form beads they absorb the calcium in the reactant solution and as enough calcium has been absorbed from the reactant solution it will need to be rebalanced in order to maintain its effectiveness.

The rinse platform 80 includes a conventional mesh strainer, sieve, or sift 82, that collects the semi-firm or firm beads while allowing the reactant solution to drain into the container 74. The beads are then sprayed, either manually or with a conventional automated spray apparatus 84. A second spay, or a second application of spray, may be applied to the beads, after which the beads are deposited into storage containers. The process of transporting the beads from the strainer 82 to the storage collection may be a manual process or it may be automated using conventional technology.

FIGS. 1-9 illustrate an exemplary apparatus (or apparatus components) that may be used to perform the methods disclosed herein and produce the beads as presently described. However, it is to be appreciated that other types of machinery may also or alternatively be used to practice the presently disclosed and claimed subject matter.

FIG. 10 describes an exemplary method of creating hydrocolloid beads in accordance with some embodiments of the present disclosure. As shown in FIG. 10, method 200 includes dispensing drops of a hydrocolloid gel suspension into a reactant bath (Block 202). In select embodiments, dispensing drops of the hydrocolloid gel suspension into the reactant bath may be accomplished using a pressurized line to force the hydrocolloid gel suspension through a plurality of nozzles.

The hydrocolloid gel suspension may contain any desired nutrients and/or additives. For example, in some embodiments, the hydrocolloid gel suspension may contain one or more plant-based and/or animal-based proteins. In select embodiments, the hydrocolloid gel suspension may contain one or more isolate proteins (e.g., wheat protein, soybean protein, pea protein, and/or other plant-based protein). The hydrocolloid gel suspension may have a viscosity within the range of 2,000 and 20,000 centipoise (e.g., 4,000-15,000 centipoise, or 5,000-10,000 centipoise) at room temperature.

Method 200 also includes exposing the drops to the reactant bath for a predetermined period of time, wherein the drops form firm or semi-firm beads as they remain in the reactant bath (Block 204). In some embodiments, the predetermined period of time the drops are exposed to the reactant bath is between one (1) minute and ten (10) minutes. In select embodiments, the drops may be exposed to the reactant bath for between two (2) and (8) minutes, or, in some cases, approximately five (5) minutes. The reactant bath may contain calcium ions (Ca2+), potassium ions (K+), and/or magnesium ions (Mg2+). The reactant bath may be kept at room temperature or above room temperature, as desired. If the reactant bath is kept at or rear room temperature, probiotics may be included in the hydrocolloid gel suspension and in the resulting beads. In some cases, the reactant bath has a temperature within a range of 60 and 180 degrees Fahrenheit. In select embodiments, the reactant bath may have a temperature within a range of 60 to 90 degrees Fahrenheit.

Method 200 further includes removing the beads from the reactant bath (Block 206). In some cases, removing the beads from the reactant bath is accomplished by separating the beads from deionized reactant, for example, using a vibrating and rotating drum. If desired, gravity and a mesh screen may be used to collect and dry the beads.

Method 200 also optionally includes, in some embodiments, reintroducing deionized reactant back into the reactant bath (Block 208). If deionized reactant is reintroduced, additional ions can be added to the reactant and/or the reactant bath to ensure a sufficient quantity of ions is available to aid in gel formation. Method 200 may be carried out, in some embodiments, at a temperature within the range of 60 to 165 degrees Fahrenheit. In select embodiments, method 200 may be carried out at a temperature within the range of 60 to 90 degrees Fahrenheit.

The beads formed by method 200 may have numerous desirable qualities. For example, the beads may have a substantially uniform cross-section with no discernable outer skin. The beads may also have a squishy (sponge-like) texture and be resistant to syneresis. The beads may have any desired size, such as between 1 mm and 5 mm, in some embodiments. The beads may have a viscosity of between 2,000 and 10,000 centipoise, such as between 4,000 and 8,000 centipoise, or approximately 5,000 centipoise, in some embodiments. The beads may have a pH of between 3.0 and 6.0, such as between 3.5 and 5.5, in some cases.

The beads may contain any desired amounts and ratios of nutrients. For example, in some embodiments, the beads may contain at least 1% protein and between 70% and 95% water. In some embodiments, the beads may contain between 2% and 10% protein and 80% to 95% water. The beads may contain a colorant, if desired.

It is understood that the embodiments described herein are merely illustrative of the present disclosure. Variations in the process and/or the construction of the device may be contemplated by one skilled in the art without limiting the intended scope of the inventive subject matter herein disclosed and as defined by the following claims. What is claimed is:

The invention claimed is:

1. A method of creating hydrocolloid beads, the method comprising:
   a) dispensing drops of a hydrocolloid gel suspension into a reactant bath, wherein dispensing drops of the hydrocolloid gel suspension into the reactant bath is accomplished using a pressurized line to force the hydrocolloid gel suspension through a plurality of nozzles, and wherein the drops are formed due to gravity, vibration of the nozzles, and/or a spinning disk or wire;
   b) exposing the drops to the reactant bath for a predetermined period of time, wherein the drops form firm or semi-firm beads as they remain in the reactant bath; and
   c) removing the beads from the reactant bath.

2. The method of claim 1, wherein the hydrocolloid gel suspension has a viscosity within a range of 2,000 and 20,000 centipoise at room temperature.

3. The method of claim 1, wherein the reactant bath contains calcium ions (Ca2+), potassium ions (K+), and/or magnesium ions (Mg2+).

4. The method of claim 1, wherein the reactant bath has a temperature within a range of 60 and 180 degrees Fahrenheit.

5. The method of claim 1, wherein removing the beads from the reactant bath comprises separating the beads from deionized reactant.

6. The method of claim 5, wherein the beads are separated from the deionized reactant with a vibrating and rotating drum.

7. The method of claim 5, further comprising introducing the deionized reactant to the reactant bath.

8. The method of claim 7, further comprising adding ions to the deionized reactant and/or the reactant bath.

9. The method of claim 1, wherein the predetermined period of time is between 1 minute and 10 minutes.

10. The method of claim 1, wherein the method is carried out at a temperature within the range of 60 to 165 degrees Fahrenheit.

11. The method of claim 1, wherein the beads have a pH within a range of 3.0 to 6.0.

12. The method of claim 11, wherein the beads have a pH of between 3.5 and 5.5.

13. The method of claim 1, wherein the beads have a size of between 1 mm and 5 mm.

14. The method of claim 1, wherein the beads have a viscosity of between 2,000 and 10,000 centipoise.

15. The method of claim 1, wherein the beads contain 0-10% protein and between 70% and 98% water.

16. A device for creating hydrocolloid beads, the device comprising:
   a delivery system configured to dispense gel drops into a reactant bath platform, wherein the reactant bath platform comprises a tray that contains a reactant solution, the tray arranged so as to allow the gel drops to be exposed to the reactant solution for a predetermined time to allow the gel drops to form semi-firm or firm beads, wherein the reactant bath platform further includes an exit port through which the semi-firm or firm beads may exit the tray;
   a rinse platform configured to capture the semi-firm or firm beads as they exit the reactant bath platform; and
   at least one gate, wherein the at least one gate is configured to form a barrier across a portion of a width of the tray; and a gap formed between the at least one gate and a sidewall of the tray.

17. A device for creating hydrocolloid beads, the device comprising:
   a delivery system configured to dispense gel drops into a reactant bath platform, wherein the reactant bath platform comprises a tray that contains a reactant solution, the tray arranged so as to allow the gel drops to be exposed to the reactant solution for a predetermined time to allow the gel drops to form semi-firm or firm beads, wherein the reactant bath platform further includes an exit port through which the semi-firm or firm beads may exit the tray; and
   a rinse platform configured to capture the semi-firm or firm beads as they exit the reactant bath platform;
   wherein a base of the tray further comprises at least one of: an inclined surface and a conveyor system.

18. The method of claim 1, wherein the beads are pasteurized at a temperature of at least 250° F.

* * * * *